United States Patent
Rassmus et al.

(10) Patent No.: US 8,776,371 B2
(45) Date of Patent: Jul. 15, 2014

(54) METHOD OF BRAZING THIN HEAT EXCHANGING PLATES AND BRAZED PLATE HEAT EXCHANGER PRODUCED ACCORDING TO THE METHOD

(75) Inventors: Jens Erik Johannes Rassmus, Malmo (SE); Per Erik Sjodin, Lund (SE)

(73) Assignee: Alfa Laval Corporate AB, Lund (SE)

( * ) Notice: Subject to any disclaimer, the term of this patent is extended or adjusted under 35 U.S.C. 154(b) by 592 days.

(21) Appl. No.: 11/983,383

(22) Filed: Nov. 7, 2007

(65) Prior Publication Data

US 2008/0127494 A1    Jun. 5, 2008

Related U.S. Application Data

(62) Division of application No. 10/476,561, filed as application No. PCT/SE02/00886 on May 3, 2002, now Pat. No. 7,685,716.

(51) Int. Cl.
*B21D 53/02* (2006.01)
*B23P 15/26* (2006.01)

(52) U.S. Cl.
USPC .............. 29/890.03; 29/890.035; 29/890.054; 165/164; 165/167

(58) Field of Classification Search
CPC ........ B21D 53/02; B21D 53/04; B21D 53/08; B21D 53/085; B23P 15/26; B23K 1/0012; F28F 3/046; F28F 3/005; F28F 2225/04; F28F 2275/04
USPC ......... 29/890.03, 890.035, 890.054; 165/164, 165/167
See application file for complete search history.

(56) References Cited

U.S. PATENT DOCUMENTS

| 3,012,903 | A | * | 12/1961 | Cape | 427/229 |
| 3,737,717 | A | * | 6/1973 | Arendash | 315/75 |
| 3,852,873 | A |   | 12/1974 | Chartet | |

(Continued)

FOREIGN PATENT DOCUMENTS

| EP | 0 551 545 A1 | 7/1993 |
| WO | WO 00/53989 | 9/2000 |

OTHER PUBLICATIONS

McDonald, A.S., "Alloys for Brazing Thin Sections of Stainless Steel," McDonald—Brazing Alloys, Welding Research Supplement, Mar. 1957, pp. 131-140.

*Primary Examiner* — Alexander P Taousakis
(74) *Attorney, Agent, or Firm* — MKG, LLC

(57) ABSTRACT

The invention refers to a method of brazing together thin heat exchanging plates of an iron based base material provided with port holes and a pressing pattern of elevations and depressions over the heat exchanging area of the plates and, if present, also over the distribution area to a plate heat exchanger. The plates are coated with brazing material and are arranged such that contact between elevations and depressions in adjacent plates is obtained prior to the brazing together. The plates are then brazed together at the resultant contact points. Only 5-40%, preferably 10-30%, of the heat exchanging area and the distribution area are coated with brazing material prior to the brazing. The invention also comprises a brazed plate heat exchanger built of thin heat exchanging plates of an iron based base material provided with port holes and a pressing pattern of elevations and depressions over the heat exchanging area and, if present, also over the distribution area which has been produced according to the method of the invention. In the brazed heat exchanger the brazing material used for the brazing is present mainly in the brazing joint.

14 Claims, 2 Drawing Sheets

(56) References Cited

U.S. PATENT DOCUMENTS

| | | |
|---|---|---|
| 4,053,969 A | 10/1977 | Bayard |
| 4,214,925 A | 7/1980 | Arita et al. |
| 4,606,495 A | 8/1986 | Stewart, Jr. et al. |
| 5,077,889 A | 1/1992 | Matsuda et al. |
| 5,263,641 A * | 11/1993 | Rafferty et al. ............... 228/220 |
| 5,385,791 A * | 1/1995 | Mizuhara et al. ............. 428/621 |
| 5,971,065 A | 10/1999 | Bertilson et al. |
| 6,006,430 A | 12/1999 | Fukuoka et al. |
| 6,269,541 B1 | 8/2001 | Iguchi et al. |
| 6,394,179 B1 * | 5/2002 | Blomgren et al. ............. 165/167 |
| 6,799,630 B1 | 10/2004 | Kato et al. |
| 2001/0047861 A1 | 12/2001 | Maeda et al. |
| 2002/0050346 A1 | 5/2002 | Colin et al. |
| 2002/0124404 A1 * | 9/2002 | Morihira et al. ............ 29/890.03 |
| 2003/0046813 A1 * | 3/2003 | Jackson et al. ............. 29/890.03 |
| 2009/0014164 A1 * | 1/2009 | Zobel et al. ................... 165/177 |
| 2009/0049794 A1 * | 2/2009 | Barone et al. ............... 52/745.21 |

\* cited by examiner

METHOD OF BRAZING THIN HEAT EXCHANGING PLATES AND BRAZED PLATE HEAT EXCHANGER PRODUCED ACCORDING TO THE METHOD

CROSS-REFERENCE TO RELATED APPLICATIONS

This application is a divisional of Utility application Ser. No. 10/476,561 filed on Apr. 2, 2004.

FIELD OF THE INVENTION

The present invention relates to a method for joining thin heat exchanging plates of an iron based material provided with port holes and a press pattern of elevations and depressions over the heat exchanging area of the plates and when present over the distribution area to a plate heat exchanger. Prior to the brazing the plates are coated with a brazing material. The plates are arranged such that contacts between elevations and depressions in adjacent plates are obtained. The obtained package of plates is heated such that the brazing material melts, at which the plates are brazed together at the contact points. The invention also comprises a brazed plate heat exchanger, which is built up of thin heat exchanging plates of an iron based material provided with port holes and a pressing pattern of elevations and depressions over the heat exchanging area of the plates and, if present, over the distribution area and is brazed together according to the method of the invention.

BACKGROUND OF THE INVENTION

When producing plate heat exchangers one generally uses thin foils of a suitable brazing material, which foils are placed between the heat exchanging plates, which are to be brazed together. The heat exchanging plates with the foils located between them form a plate package comprising the desired number of passages for the media, which shall exchange heat. The plate package is placed in a furnace and is heated to the temperature at which the brazing material melts. The brazing may take place under vacuum or in presence of an inert or active shielding gas, such as nitrogen, hydrogen, helium or argon or combinations thereof.

In order to obtain a joint by brazing it is required that the brazing material wets the surface of the objects which are to be brazed together and that the brazing material has a melting point that is below the melting point of the objects which are to be joined together.

If one uses a brazing material in the shape of a powder this may be mixed with a binder or may alternatively be added to the plates in two steps.

The brazing material may also be dispersed in a mixture of binder and liquid and be painted or sprayed on the surface of base material. Another way is to apply the binder firstly and the pulverized brazing material thereafter. In case a binder is used, the plate package is suitably heated in steps in such a way that the binder is vaporized, before the material reaches brazing temperature.

In order to secure a sufficient strength of the heat exchanger one strives to obtain perfect brazing joints, which do not contain brittle phases or cracks. Brittle phases and cracks constitute crack initiating sites for fatigue failure and may form conditions for formation of corrosion cells, which may cause serious faults in a heat exchanger. The resulting crack initiating sites may also give rise to a leaching of alloy elements to the heat exchanging media, which is unsuitable in brazed constructions for food applications.

When using active brazing material, that is brazing material which contains elements which lower the melting point, the risk that brittle phases are formed increases. This depends on processes, which affect the diffusion rate of the melting point lowering elements in and around the brazing joint. If the driving force for diffusion and the kinetic conditions are suitable the so called critical joint clearance increases, the joint clearance where no brittle phases develop in the joint.

The brazing materials, which are used today, have often good flowability and wetting properties in order to penetrate into crevices and achieve a good bonding to the base material. In plate heat exchangers, where the plates which are to be brazed together, have a press pattern with elevations and depressions it is usual that the brazing joints have the shape of a point. Generally one uses a brazing material in the shape of a foil of uniform thickness, which covers the whole plate apart from the port holes. This means that one uses a surplus of brazing material in order to have a sufficient amount of brazing material in the brazing joints. Since it is difficult to control the amount of brazing material in the brazing joint, the risk increases that the amount of brazing material will be too large in certain brazing joints. At which the risk for brittle phases increase.

The article "Alloys for brazing thin sections of stainless steel" by A. S. McDonald in Welding Journal March 1957 discusses which alloys may be considered suitable for brazing thin steel elements for example to heat exchangers. An ideal alloy should according to the author of the article be able to wet and flow over a stainless steel surface without any flux agent during brazing in a shielding atmosphere. It should not damage the base material by dissolving the same or penetrate into the material and the obtained brazing joint should have a good mechanical strength and be resistant to oxidation.

The article continues with the statement that the popular nickel based alloys which contain boron and which in other connections are very useful cannot be used depending on their dissolving and penetrating properties.

SUMMARY OF THE INVENTION

According to the invention it has been found that by using a totally seen smaller amount of brazing material one may obtain an increased strength in the brazed plate heat exchanger both when using the brazing materials mentioned above and others for the application suitable brazing materials.

The method according to the invention is mainly characterized in that 5-40%, preferably 10-30% of the heat exchanging area and when present the distribution area is coated with brazing material prior to the brazing. The brazing together of the plates around to port holes and around the edges is carried out in the usual way and is not affected by the present invention. The plates, which are used in brazed plate heat exchangers have a thickness up to 0.8 mm. When using a thicker plate material the heat exchanging capability becomes impaired to a great extent. In a pressurized brazed plate heat exchanger, it is only the brazing joints between the plates, which carry the load. Only the amount of brazing material found in the brazing joints influence the capability to withstand the strain the joints are exposed to.

According to the method of the present invention the brazing material is applied selectively at all point shaped and line shaped contact surfaces. Alternatively the brazing material may be applied selectively only at a certain number of point shaped or line shaped contact surfaces. Usually one chooses one of these two methods depending on the design of the pressing pattern, the thickness of the plates and the pressure conditions that the plate heat exchanger is subjected to. In dependence of the application the pressure may vary between 1-40 bar.

In order to obtain a plate heat exchanger with a maximal strength only enough brazing material is added so that a substantially ductile brazing joint is obtained. Such a brazing joint contains no, or only a minor amount of brittle phases. Briffle phases in a brazing joint may imply that the brazing joint breaks earlier due to fatigue (the life time is reduced), and also form a crevice for a corrosion attack. A ductile brazing joint is obtained when the amount of brazing material exceeds the area of the contact points only to a small extent.

In the method of the invention the brazing material consists of an active brazing material, that is a brazing material containing elements, which diffuse into the iron based plate material and at that change the melting interval for the material in the brazing joint. Such brazing material may be Ni-alloy with Cr and a melting point lowering additive or of a stainless steel with a melting point lowering additive. The present invention is not limited in this regard, however, as the method may employ a brazing material that contains no melting point lowering elements and includes a material which interacts with the base material in the heat exchanging plates in that elements from the base material of the plates migrate into the braze material and give a harder braze joint. There are also Co- or Ag-based brazing materials.

The used brazing material may consist of a material which interacts with the base material in the heat exchanging plates in that elements in the base material migrate into the braze filler and thereby give a brazing joint with a higher strength, as is known for Cu and Ag-brazing materials.

The brazing material may, according to the invention, contain a non-active filling material, as for example a cellulose based binder.

The invention also comprises a brazed heat exchanger built up of thin heat exchanging plates of an iron based material provided with port holes and a pressing pattern of elevations and depressions over the heat exchanging area of the plates and if present over the distribution area produced according to the main claim. The brazing material used for the brazing is mainly present in the brazing joint after the brazing.

A brazed plate heat exchanger according to the invention is produced by joining the plates with an active brazing material, that is a brazing material containing melting point lowering elements, which can diffuse into the base material during brazing. After the joining the brazing material is present mainly in the brazing joint apart from the melting point lowering elements, which have diffused into the iron based plate material.

According to the method of the invention the brazing material may be applied in different ways, one may apply a string or drops of brazing material by pressing it through a nozzle. One may also apply a binder in drops or strings and then scatter brazing powder over the surface. Surplus brazing material must then be removed prior to the brazing. The brazing material may also be applied on the heat exchanger plate by some kind of printing for example screen-printing. By this method the brazing material may be applied rapidly on the plate.

Choice of binder and the amount used depends on the demands for shape permanence after dispensation and also on parameters such as feeding, pressure and dimension of the dispensing nozzle. Gelatinous binders, usually cellulose based, are used for dispensation, since they hinder the setting of particles of brazing material during storage and after dispensation. In common 9-15% binder is used. The amount depends on the size distribution of the particles in the brazing powder. The larger the share of fine fraction, the more binder is needed to obtain a smooth paste.

For screen printing, printing through a silk screen, a thin slurry of powder particles is used. The binder seldom needs to have an especially high viscosity, maximally around 2000 cps, and a higher amount of binder may be used, up to 20%.

For stencil printing, printing through open holes, the mixture of brazing powder and binders must be as viscous as fine granular clay. The paste shall be capable of rolling in front of the blades and be pushed through the holes in the stencil. A representative value for the viscosity for this kind of paste, binder and powder, is >50.000 cps.

The viscosity of the brazing material may be increased by adding finely divided base material or particles which do not melt during brazing to a brazing material known per se.

The desired amount of brazing material is supplied to the contact points which are to be brazed together in any of the described or other ways. At that the brazing material covers an area that is somewhat larger than the contact point. The contact points may have a diameter of two mm. The brazing material is drawn by capillary forces into the crevice between the two heat exchanging plates, which are to be joined. If desired, the brazing material may be applied such that before the brazing it has the shape of a ring which surrounds the contact point.

Plates used in brazed heat exchangers often have a pressing pattern of herring bone type over the heat exchanging area. Depending on the shape of the pattern the amount of brazing material which is added varies to some extent but as an example it may be mentioned, that the heat exchanging area is covered to 13-15% with brazing material, when brazing material is applied at points at all contact points. If the brazing material is applied as strings the brazing material covers about 30% of the heat exchanging area for the same kind of pressing pattern. If the plate has a pattern without crossing elevations and depressions but with some other kind of contact between the plates the area is coated with brazing material to somewhat more that 10%. At each brazing point 1-30 mg brazing material is applied.

According to the invention one tries to attain that the brazing joint shall contain only a little amount of brittle phases. The amount of brittle phase affects the fatigue strength negatively. The amount of brittle phase depends on the joint clearance, the thickness of the plate, the amount of brazing material, how the brazing material is applied and by the time-temperature relation during the brazing.

BRIEF DESCRIPTION OF THE DRAWINGS

The attached drawings show in
FIG. 1 a graph of the tensile force for a ductile brazing joint and in
FIG. 2 a graph of the tensile force for a brazing joint with a large amount of brittle phases.

DETAILED DESCRIPTION OF THE PREFERRED EMBODIMENT

For the tests one uses circular blanks of a certain plate thickness which are joined together in a predetermined manner with a varying amount of brazing materiel. The tensile force of the obtained brazing joints (4 units) is tested. The joined plate blanks are drawn from each other with a certain fixed strain rate.

Figure 1:
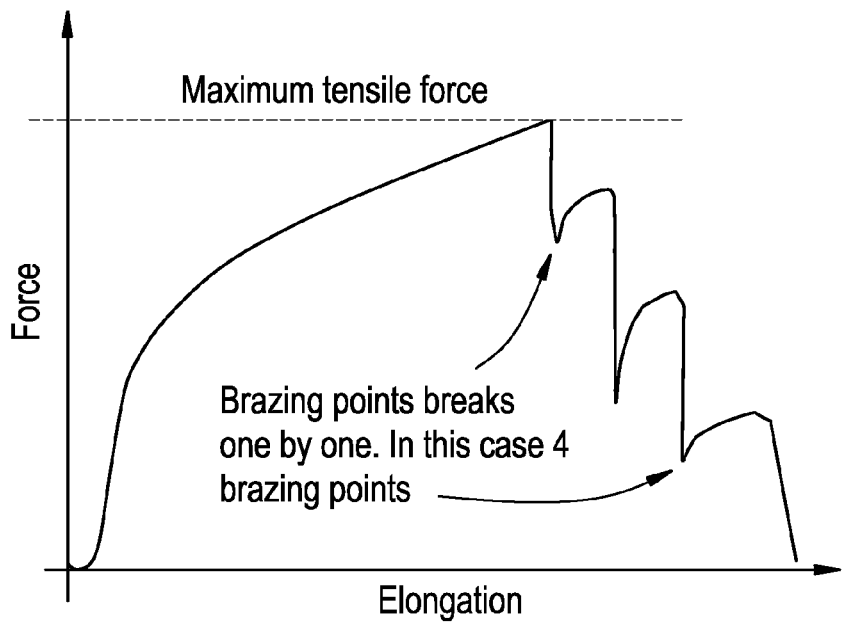

As is seen in FIG. 1 which shows a tensile test graph for test blanks, which have been brazed together after point by point application of the brazing material, the ductile brazing point is stretched in an even curve until the first brazing point breaks at maximum tensile force. The other brazing points then break one after the other.

Figure 2:
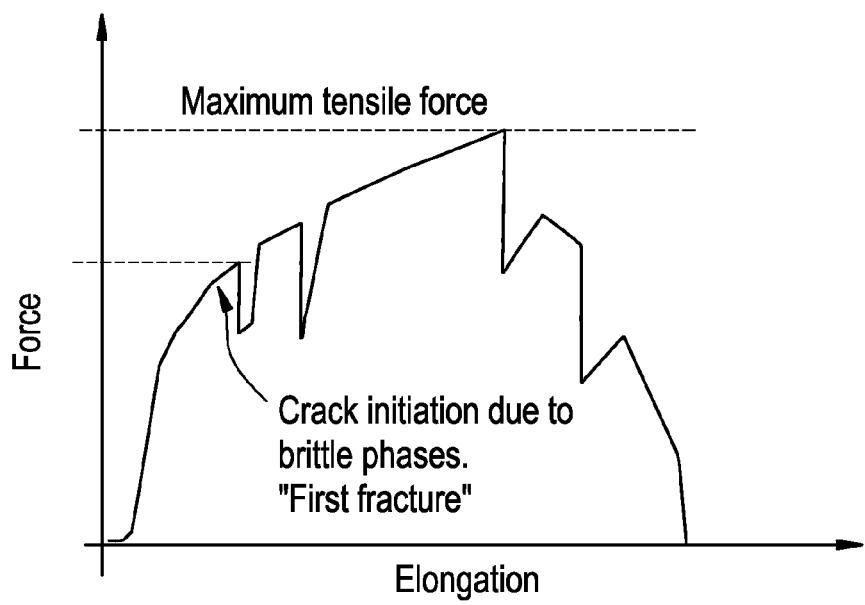

In FIG. 2 which shows a tensile test graph for test blanks, which have been covered with brazing material over the complete surface area it may be seen that this curve already prior to maximum tensile force shows notches which indicate brittles phases and crack initiation. The notches represent pre-cracks, which are critical for fatigue performance for example.

Figure 3:
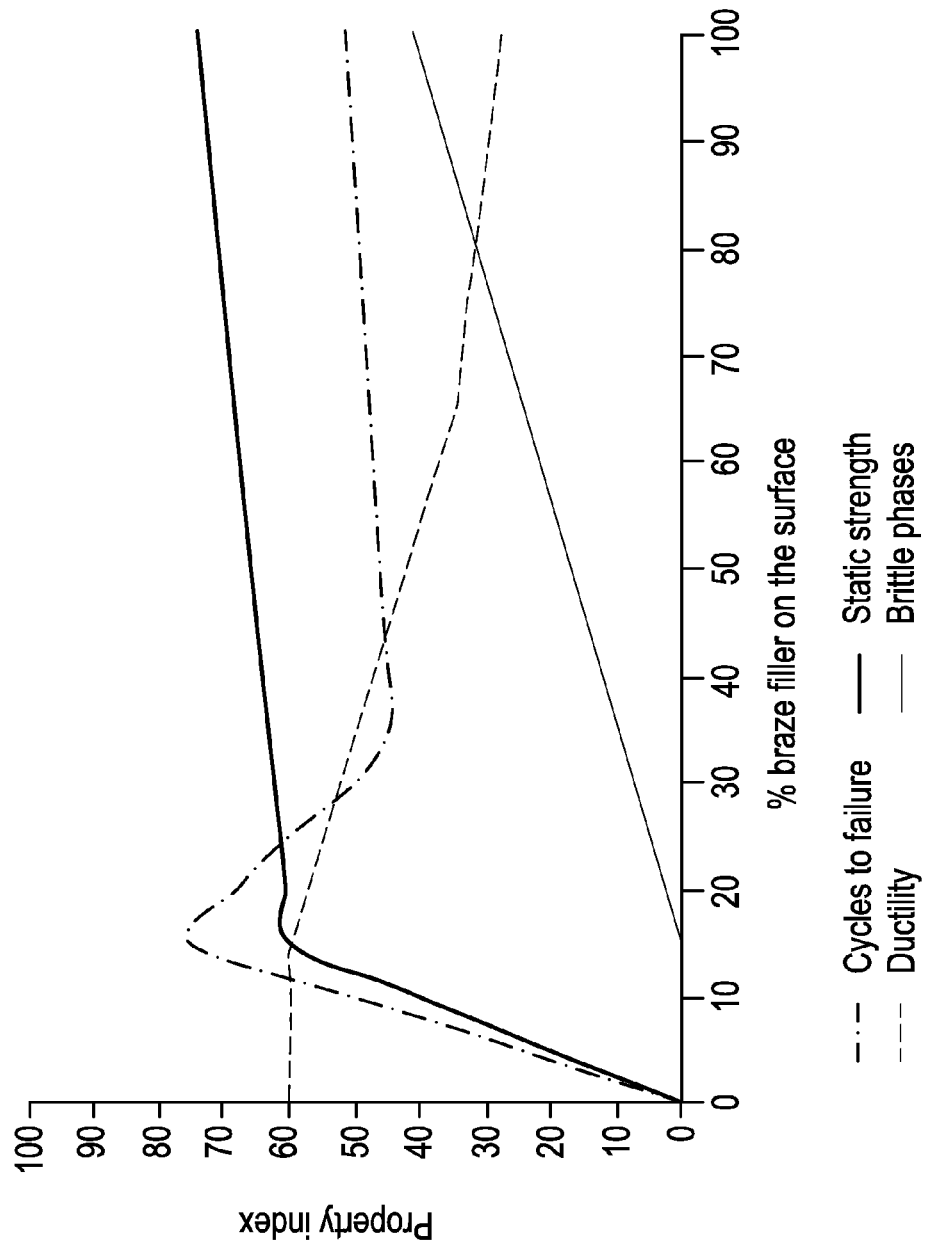
FIG. 3 shows a principal graph of how the brazing joints and at that how the properties of the brazed heat exchanger are affected by the amount of brazing material.

FIG. 3 shows a principle sketch of how different properties of a brazed plate heat exchanger are changed as a consequence of the change in the amount of braze filler over the heat exchanging surface area inclusive the distribution area if such is present. Graphs with similar changes in properties are obtained for active brazing materials based on Co-, Ni- or Fe-alloys. As may be seen from the graph the amount of brittles phases increases with an increasing amount of braze filler as percent of the total surface area. When the amount of brittle phases increases the ductility is reduced. The number of cycles to failure (lifespan) as a function of percentage braze filler on the surface initially increases to an apex, where after the life span drops to a near constant value.

A balance between positive and negative factors implies that an application of the surface with braze filler in the interval 5-40% gives a brazed heat exchanger with improved static and dynamic strength, long life and ductile brazing joints.

Within the interval 10-30% there is achieved a maximal result.

The invention claimed is:

1. A method of joining thin heat exchanging plates comprising the steps of;
   providing plates of an iron-based material, the plates having port holes and a pressing pattern of elevations and depressions over a heat exchanging area of the plates and, if present, over a distribution area to a plate heat exchanger;
   providing a braze material which contains iron-based braze filler and melting point lowering elements prior to brazing;
   coating 5-40% of the heat exchanging area and distribution area of the plates with the braze material so that both the iron-based braze filler and melting point lowering elements are coated on the 5-40% of the heat exchanging area and distribution area of the plates, or coating 5-40% of the heat exchanging area of the plates, wherein the plates are coated with the braze material so that both the iron-based braze filler and melting point lowering elements are coated on the 5-40% of the heat exchanging area of the plates, prior to the joining;
   arranging the plates in such way that a direct interfacial contact between adjacent elevations and depressions defines a plurality of contact points;
   creating brazed joints by brazing the plates together at the contact points and wherein the braze material is present in the brazed joints;
   wherein the contact points include at least one of point shaped contact points and lined formed contact points; and wherein the melting point lowering elements of the braze material have diffused into the iron-based plate material, which changes the melting interval of the material in the brazing joint.

2. A method according to claim 1, wherein instead of 5-40% of the heat exchanging area and distribution area being coated with 5-40% braze material prior to brazing, they are coated with 10-30% of braze material prior to brazing.

3. A method according to claim 1, wherein the amount of braze material is so small that mainly ductile brazing joints are obtained.

4. The method of claim 1, wherein the contact points are about two mm in size.

5. The method of claim 1, wherein about 1 to 30 mg of braze material is applied to each contact point.

6. The method of claim 1, wherein the braze filler comprising a stainless steel alloy comprising one or more melting point lowering additives.

7. A method of joining thin heat exchanging plates, said method comprising the steps of:
   providing plates made from an iron-based material and having port holes and a pattern of elevations and depressions over heat exchanging areas of said plates and over any distribution areas of said plates;
   providing a braze material which contains iron-based braze filler and melting point lowering elements prior to brazing;
   coating 5% to 40% of said heat exchanging areas and any of said distribution areas of each plate with the braze material so that both the iron-based braze filler and melting point lowering elements are coated on the 5-40% of the heat exchanging area and any of said distribution areas of each plate;
   obtaining ductile brazing joints selectively at all contact points between said plates;
   arranging said plates to obtain direct interfacial contact at said contact points between elevations and depressions on adjacent plates;
   brazing said arranged plates together at the contact points, and that the braze filler material is present in the obtained brazed joints; and
   wherein the iron-based braze filler is present in the brazed joints and wherein the melting point lowering elements have diffused into the iron-based material of the plates to change a melting interval of said braze material in said brazing joints.

8. The method of claim 7, wherein 10% to 30% of said heat exchanging areas and any of said distribution areas of each plate are coated with said braze material.

9. The method of claim 7, wherein the contact points include at least one of point shaped contact points and lined formed contact points and wherein said braze material is selectively applied less than all of the point shaped and the line formed contact points.

10. A method of joining thin heat exchanger plates, the method comprising the steps of:
    providing plates made from an iron-based material and having port holes and a pattern of elevations and depressions over heat exchanging surfaces of the plates and over distribution areas of the plates;
    providing a braze material which contains iron-based braze filler and melting point lowering elements prior to brazing;
    coating 5% to 40% of the heat exchanging surfaces and the distribution areas of each plate with the braze material so that both the iron-based braze filler and melting point lowering elements are coated on the 5-40% of the heat exchanging surfaces and the distribution areas of each plate;

arranging the plates to obtain contact between elevations and depressions on adjacent plates such that the elevations and depressions are in direct interfacial contact;

brazing the arranged plates together at the contact points obtained;

obtaining ductile brazing joints selectively at all contact points between the plates; and wherein the iron-based braze filler is present in the brazed joints and wherein the melting point lowering elements have diffused into the iron-based material of the plates.

11. The method of claim 10, wherein 10 to 30% of the heat exchanging areas and the distribution areas of each plate are coated with the iron-based braze material.

12. The method of claim 10, wherein the contact points are at least one of point shaped and line formed.

13. A method of joining thin heat exchanging plates consisting of the steps of:

providing plates of an iron-based material, the plates having port holes and a pressing pattern of elevations and depressions over the heat exchanging area of the plates and, if present, over the distribution area to a plate heat exchanger;

providing a braze material which contains iron-based braze filler and melting point lowering elements prior to brazing;

coating 5-40% of the heat exchanging area and distribution area of the plates with the braze material so that both the iron-based braze filler and melting point lowering elements are coated on the 5-40% of the heat exchanging area and the distribution areas of the plates, prior to the joining;

arranging the plates in such way that a direct interfacial contact between adjacent elevations and depressions defines a plurality of contact points;

creating brazed joints by brazing the plates together at the contact points and wherein the braze material is present in the brazed joints; and wherein the melting point lowering elements of the braze material have diffused into the iron-based plate material, which changes the melting interval of the material in the brazing joint.

14. The method of claim 13, wherein the brazed joints contain no brittle phases.

* * * * *